United States Patent [19]

Hisada et al.

[11] Patent Number: 4,584,024

[45] Date of Patent: Apr. 22, 1986

[54] PROCESS FOR PRODUCING PREGELATINIZED POTATO STARCH FOR USE AS A BINDER IN FEEDS FOR FISH

[75] Inventors: Yoji Hisada, Richland, Wash.; Koichi Sasamoto; Masao Ichinose, both of Takasago; Osamu Utaka, Kakogawa, all of Japan; Seiya Nakayama, Richland, Wash.

[73] Assignee: Kanegafuchi Kagaku Kogyo Kabushiki Kaisha, Osaka, Japan

[21] Appl. No.: 556,477

[22] Filed: Nov. 30, 1983

[51] Int. Cl.$^4$ .......................... A23K 1/14; A23K 1/18
[52] U.S. Cl. .......................... 127/66; 127/69; 127/71; 426/1; 426/661; 426/805
[58] Field of Search ................. 127/66, 69, 71; 426/1, 426/465, 555, 661, 805

[56] References Cited

FOREIGN PATENT DOCUMENTS

| 143027 | 7/1980 | German Democratic Rep. | 426/1 |
|--------|--------|----------|-------|
| 130395 | 10/1979 | Japan | 426/1 |
| 19039 | 2/1980 | Japan | 426/805 |
| 189647 | 11/1982 | Japan | 426/1 |
| 23753 | 2/1983 | Japan | 426/1 |

OTHER PUBLICATIONS

"Food Industry", No. 6, 1974 and Abridged Translation VI corresponding to pp. 27-28 thereof.

*Primary Examiner*—Richard V. Fisher
*Assistant Examiner*—W. Gary Jones
*Attorney, Agent, or Firm*—Sughrue, Mion, Zinn, Macpeak and Seas

[57] ABSTRACT

Alpha-potato starch with a quality suitable for use as a binder in feeds for fish can be produced by first adjusting the electrical conductivity of a potato starch slurry, then thermal gelatinizing and dehydrating the same.

10 Claims, No Drawings

PROCESS FOR PRODUCING PREGELATINIZED POTATO STARCH FOR USE AS A BINDER IN FEEDS FOR FISH

BACKGROUND OF THE INVENTION

The present invention relates to a process for producing pregelatinized potato starch (hereinafter referred to as alpha-potato starch) for use as a binder in feeds for fish, particularly, feeds for eel.

In cultivation of fish, for example, eel, alpha-potato starch is commonly incorporated in feeds as a binder. Because of its transparency and higher viscosity, alpha-potato starch is best suited for use as a binder in feeds for eel. However, the potato-starch which is to be thermal gelatinized is a natural product and its quality differs greatly from one lot to another. Furthermore, the quality of the potato-starch has direct effects on the final quality of the alpha-potato starch. As a matter of fact, manufacturers of alpha-potato starch have long found it necessary to maintain the quality of their products by using select and therefore costly starch.

The conventional feed for cultivating eel is based on white fishmeal which is supplemented with vitamins or nutrients plus 20–25% of alpha-potato starch as a binder. The eel grower adds 5–10% feed oil and 110–130% water to the feed, kneads them with a mixer, and feeds the eel with the resulting mixture. The alpha-potato starch is required to satisfy the following conditions: (1) it keeps the integrity of the feed in water until the eel has finished its eating; (2) it is easily digestable and retains the viscoelasticity of the feed that assits in the eating by the eel; (3) it inhibits the dissolution of water-soluble additives; (4) it ensures easy removal of the feed from the mixer. The quality of alpha-potato starch largely depends on the quality of white fishmeal, the temperature of water in which the eel is grown, and the temperature of atmosphere. Therefore, actual alpha-starch products have various viscosity characteristics so adjusted as to provide the proper viscoelasticity according to the quality of the fishmeal and the seasonal change. As already mentioned, alpha-starch producers attain this object by using select potato starch. In addition, they control the operating conditions of a conventionally used drum dryer, particularly, the heating temperature and the rotational speed of the drum. However, the change in the operating conditions of the drum could cause a significant drop in the efficiency of the dryer and is not desired.

As is well known, the physical properties of gelatinized potato starch vary greatly according to the content of phosphoric acid that forms an ester with the glucose of which the starch is made, as well as to the composition of metallic ions bonded to that phosphoric acid. Phosphoric acid is present in the potato tissue in the form of a potassium salt, but during the starch production, the potassium ion is replaced by divalent calcium and/or magnesium ion in the process water, which reduces the gelatinizing properties of the starch and adversely affects the quality of alpha-starch. The starch slurry also contains free ions that are not bound to the phosphoric acid. Extensive studies have been made on the effects of various free ions on the viscosity characteristics of the starch, but nobody has studied their effects on the quality of alpha-starch.

SUMMARY OF THE INVENTION

One object of the present invention is to provide a process that ensures easy production of alpha-potato starch with the desired quality by adjusting the electrical conductivity of a potato starch slurry.

Another object of the present invention is to provide a process that ensures the production of alpha-potato starch on an industrial scale without requiring technical skill and the change in the operating conditions that lead to lower productivity.

Other objects and advantages of the invention will become apparent by reading the following part of this specification.

DETAILED DESCRIPTION OF THE INVENTION

As a result of our studies made on the relation between the free ions present in the starch slurry and the quality of the resulting alpha-starch, we have found that the free ions caused greater effects on the quality of alpha-starch than the composition of metallic ions bound to the phosphoric acid in the starch. We have also found that the determination of the content of free ions can be replaced by an industrially far simpler determination of the electrical conductivity of the starch slurry. The present invention is based on these findings, and provides a process for producing alpha-potato starch for use as a binder in feeds for fish, which comprises adjusting the electrical conductivity of a potato starch slurry to $300\mu\mho$ cm or less, then thermal gelatinizing and dehydrating the same.

The potato starch from which the final alpha-starch is produced may be an aqueous suspension of dehydrated potato starch or a starch slurry directly produced from a starch mill or potato processing mill. The electrical conductivity of the starch usually depends on the electrical conductivity of the process water, the time-dependent change of the starch slurry, and the pH of the slurry during storage. A potato starch slurry having an electrical conductivity in excess of $300\mu\mho/cm$ is washed with pure water to reduce its electrical conductivity below $300\mu\mho/cm$, preferably to a certain value between 10 and $200\mu\mho/cm$, and the so adjusted slurry is thermal gelatinized and dehydrated with a drum dryer, and subsequently ground into particles. The determination of the electrical conductivity of the starch slurry may be made at a starch concentration in the range of 10 to 45%. The quality of the final alpha-potato starch reflects the electrical conductivity of the starch slurry. With a conductivity of $10-40\mu\mho/cm$, a soft and easily spreading product is obtained by kneading the alpha-potato starch with white fishmeal. Therefore, the alpha-potato starch is suitable for mixing with a hard meal. If the electrical conductivity of the starch slurry is $100-200\mu\mho/cm$, the resulting alpha-starch provides hard and highly elastic properties and hence is suitable for mixing with a soft meal. If the electrical conductivity is more than $40\mu\mho/cm$ and less than $100\mu\mho/cm$, an alpha-starch product which is high both in elasticity and in spreadability is obtained and this is suitable for use with every type of meal. If the starch slurry has an electrical conductivity in excess of $300\mu\mho/cm$, the resulting alpha-starch is not practical because it is low both in integrity and in viscoelasticity. A starch slurry having an electrical conductivity less than $10\mu\mho/cm$ cannot be adjusted to a suitable value even if it is washed with pure water.

The potato starch may be washed with pure water in the presence of an ion-exchange resin or fiber: first, the starch is rinsed in the presence of a cation-exchange resin or fiber, and a starch slurry is separated; then, the so separated slurry is rinsed in the presence of an anion-exchange resin or fiber and the desired starch slurry is obtained. Alternatively, the starch may be rinsed with pure water in the presence of a metallic ion sequestering agent or chelating agent such as citric acid, polyphosphoric acid or ethylenediaminetetraacetic acid, and this technique is also effective in adjusting the electrical conductivity to the desired range. If the potato starch slurry has an undesirably low electrical conductivity, the desired electrical conductivity may be obtained by adding a suitable inorganic or organic salt such as sodium chloride which is neutral and non-toxic and imparts the starch slurry with an adequate electrical conductivity. There is no limitation on the type of the electrolyte except that it is preferably selected by considering the safety features of the final feed.

In the prior art technique, the production of alpha-starch of best quality has required adjustments in two aspects: selecting a potato starch with a maximum phosphoric acid content which is combined more with potassium ions than with divalent metallic ions such as calcium and magnesium ions; and properly controlling the operating conditions such as the heating temperature of the drum dryer and the rotational speed of the drum. However, according to the process of the present invention, once the operating conditions are adjusted to an optimum, alpha-starch of the desired quality can be easily obtained by simply adjusting the electrical conductivity of the potato starch slurry. This is certainly a great advantage for commercial operation because, for one thing, adjustment of the operating conditions of the drum dryer which requires a high degree of technical skill is eliminated, and for another, the decrease in productivity that accompanies the change in the operating conditions can be avoided. Needless to say, the present invention does not preclude the production of the desired alpha-starch by means of optimal adjustment of the operating conditions as effected in the prior art technique.

The present invention is hereunder described in greater detail by reference to working examples, which are given here for illustrative purposes only and are by no means intended to limit the scope of the invention.

EXAMPLE 1

A potato starch slurry having a starch concentration of 35% and an electrical conductivity of 360μʊ/cm was recovered from process water in the slicing step of the process of producing French fried potatoes. A 10 liter-portion of this slurry was filtered in vacuo, and the resulting starch cake was rinsed with pure water having an electrical conductivity of 0.5μʊ/cm. The cake was dispersed in pure water of the same conductivity so as to provide a starch concentration of 30% and an electrical conductivity of 110μʊ/cm. Two more portions of the same starch slurry each measuring 10 liters were washed with an even larger volume of pure water in order to prepare two potato starch slurry sample seach having a starch concentration of 30%. One of them had an electrical conductivity of 50μʊ/cm, and the other had a conductivity of 20μʊ/cm. Each of the three samples was fed to the top of a double drum dryer (vapor pressure: 4kg/cm²G), and according to the conventional manner, the slurry was thermal gelatinized and dehydrated on the drum.

Subsequently, the dehydrated alpha-starch was ground into particles. As a control, a potato starch slurry having an electrical conductivity of 360μʊ/cm was processed into alpha-starch without rinsing with pure water.

The four alpha-starch samples were checked for their viscoelasticity, integrity and organoleptic properties. The viscoelasticity was determined by a conventional method with an emylograph-viscograph of Bravender AG., West Germany. The integrity was evaluated with a mixograph of National Corporation, U.S.A., using a mixture of white fishmeal (24 g), alpha-starch (6 g) and tap water (37.5 ml). The organoleptic evaluation was performed on a sample prepared by kneading with hand a mixture of white fishmeal (80 parts) and alpha-starch (20 parts) in the presence of tap water (120 parts, 20° C.). The results of these evaluations are shown in Table 1.

TABLE 1

| Test results | | | Organoleptic results | | |
|---|---|---|---|---|---|
| Electical conductivity of starch slurry | maximum B.U. on amylograph | results with mixograph | kneading time (sec.) | remarks | deterioration |
| 110 μʊ/cm | 1,400 | rather slow to attain integrity, but high peak value | 45 | hard and highly elastic, suitable for mixing with soft meal | absent |
| 50 μʊ/cm | 930 | quick to attain integrity | 35 | high both in elasticity and in spreadability, suitable for mixing with every type of meal | absent |
| 20 μʊ/cm | 700 | low peak value but quick to attain integrity | 25 | soft and easily spreading, suitable for mixing with hard meal | absent |
| 360 μʊ/cm | 430 | slow to attain integrity, poor viscoelasticity | 60 | unsuitable for use as binder | present |

EXAMPLE 2

Dehydrated potato starch powder (3 kg) was mixed with 7,000 ml of pure water having an electrical conductivity of $0.5\mu\upsilon$/cm to provide 10 kg of a starch slurry having an electrical conductivity of $75\mu\upsilon$/cm. Sodium chloride was added to the slurry in an amount sufficient to provide an electrical conductivity of $120\mu\upsilon$/cm. The so adjusted slurry was sprayed onto the top of a double drum dryer (vapor pressure: 6 kg/cm$^2$G) in the conventional manner. Without retaining the gelatinized starch on the drum, the starch was momentarily thermal gelatinized and dehydrated. Subsequently, the dehydrated alpha-starch was ground into particles. Another sample was prepared in the same manner except that it was prepared from a starch slurry that was not incorporated with sodium chloride and had an electrical conductivity of $75\mu\upsilon$/cm. Still another sample was prepared as in Example 1 from a starch slurry that was rinsed with pure water to have its electrical conductivity adjusted to $25\mu\upsilon$/cm. The three samples were subjected to the same tests as in Example 1 and the results are shown in Table 2.

TABLE 2

| Test results | | | Organoleptic results | | |
|---|---|---|---|---|---|
| Elecrical conductivity of starch slurry | maximum B.U. on amylograph | results with mixograph | kneading time (sec.) | remarks | deterioration |
| $120\ \mu\upsilon$/cm | 1,050 | slow to attain integrity, but high peak value | 50 | hard and highly elastic, suitable for mixing with soft meal | absent |
| $75\ \mu\upsilon$/cm | 1,100 | quick to attain integrity | 35 | high both in elasticity and in spreadability, suitable for mixing with every type of meal | absent |
| $25\ \mu\upsilon$/cm | 820 | low peak value but quick to attain integrity | 25 | soft and easily spreading suitable for mixing with hard meal | absent |

EXAMPLE 3

A potato starch slurry having a starch concentration of 35% and an electrical conductivity of $360\mu\upsilon$/cm was recovered from process water in the slicing step of the process of producing French fried potatoes. A 10-liter portion of this slurry was mixed with 50 g of H-form strong acidic cation exchange fiber (2–3 cm long) having an ion exchange capacity of 1 mg eq. per gram (ab. dry basis). The mixture was stirred for 30 minutes and passed through a sieve (100 mesh) to remove the ion-exchange fiber while washing with pure water. The slurry was subsequently mixed with 50 g of OH-form strong basic anion exchange fiber (2–3 cm long) having an ion exchange capacity of 1 mg eq. per gram (ab. dry basis). The mixture was stirred for 30 minutes and passed through a sieve (100 mesh) to remove the ion-exchange fiber while washing with pure water. By this procedure, a potato starch slurry having a starch concentration of 20% and an electrical conductivity of $22\mu\upsilon$/cm was obtained. One more portion of the same starch slurry measuring 10 liters was washed with pure water in the presence of cation and anion exchange fibers each weighing 20 g, so as to prepare a potato starch slurry having a starch concentration of 20% and an electrical conductivity of 105 $\mu\upsilon$/cm. The two samples were fed to the top of a double drum dryer (vapor pressure: 4 kg/cm$^2$G), and by the conventional procedure, the slurry was thermal gelatinized and dehydrated on the drum.

Subsequently, the dehydrated alpha-starch was ground into particles. As a control, a potato starch slurry having a starch concentration of 20% and an electrical conductivity of 340 $\mu\upsilon$/cm was processed into alpha-starch by rinsing with tap water in the absence of ion exchange fibers. The three samples were subjected to the same tests as in Example 1 and the results are shown in Table 3.

TABLE 3

| Test results | | | Organoleptic results | | |
|---|---|---|---|---|---|
| Electical conductivity of starch slurry | maximum B.U. on amylograph | results with mixograph | kneading time (sec.) | remarks | deterioration |
| 105 $\mu\upsilon$/cm | 1,200 | rather slow to attain integrity, but high peak value | 40 | hard and highly elastic, suitable for mixing with soft meal | absent |
| 22 $\mu\upsilon$/cm | 720 | low peak value, but quick to attain integrity | 25 | soft and easily spreading, suitable for mixing with hard meal | absent |
| 340 $\mu\upsilon$/cm | 450 | slow to attain integrity poor viscoelasticity | 60 | unsuitable for use as binder | |

What is claimed is:

1. A process for producing alpha-potato starch for use as a binder in feed for fish, which comprises carrying out the following steps in order:
   (a) measuring electrical conductivity of a potato starch slurry having an initial conductivity greater than or equal to $10\mu\upsilon$/cm;
   (b) adjusting the electrical conductivity of the potato starch slurry to a value between 10 and 300 $\mu\upsilon$/cm; and
   (c) thermally gelatinizing and dehydrating the potato starch slurry.

2. A process according to claim 1, wherein determination of the electrical conductivity of the starch slurry is made at a starch concentration in a range of 10–45%.

3. A process according to claim 1, wherein the electrical conductivity of the potato starch slurry is adjusted to a value between 10 and $200\mu\upsilon$/cm.

4. A process according to claim 3 wherein the electrical conductivity of the potato starch slurry is adjusted to between 10 and 40 $\mu\upsilon$/cm so as to provide alpha potato-starch suitable for mixing with a hard meal.

5. A process according to claim 3 wherein the electrical conductivity of the potato starch slurry is adjusted to between 100 and 200μ℧/cm so as to provide alpha-potato starch suitable for mixing with a soft meal.

6. A process according to claim 3 wherein the electrical conductivity of the potato starch slurry is adjusted to a value in excess of 40μ℧/cm but less than 100μ℧/cm so as to provide alpha-potato starch suitable for mixing with every type of meal.

7. A process according to claim 1, wherein the electrical conductivity of the potato starch slurry is adjusted by rinsing with pure water.

8. A process according to claim 1, wherein the electrical conductivity of the potato starch slurry is adjusted in the presence of an ion-exchange resin or fiber.

9. A process according to claim 1 wherein the electrical conductivity of the potato starch slurry is adjusted in the presence of a metallic ion sequestering agent or a chelating agent.

10. A process according to claim 1, wherein the electrical conductivity of the potato starch slurry is adjusted by addition of an inorganic or organic salt.

* * * * *